March 22, 1960     D. G. HUTTON     2,929,104
RESILIENTLY MOUNTED SELF-ALIGNING MOLD STRUCTURE
Filed April 2, 1954     3 Sheets-Sheet 1
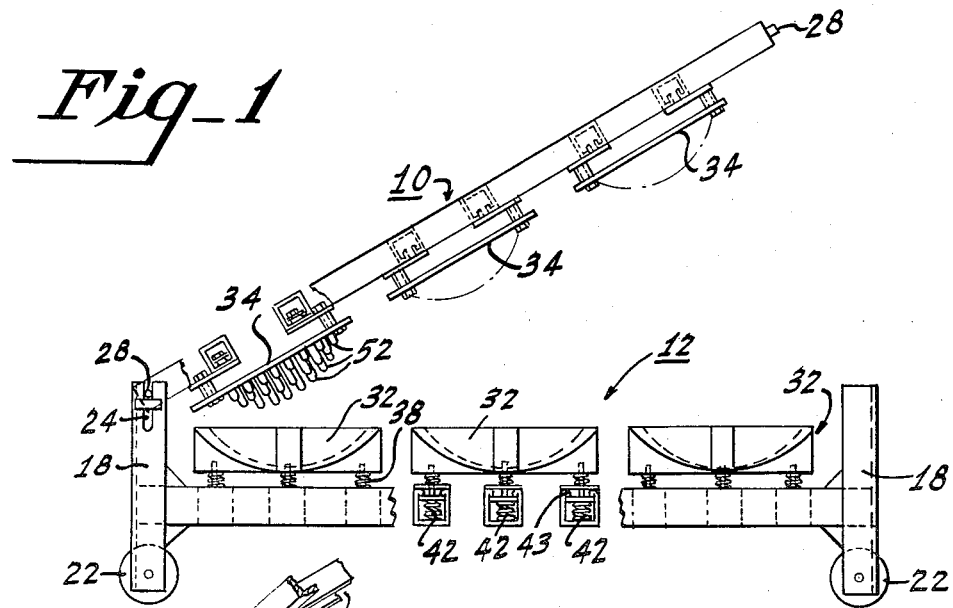
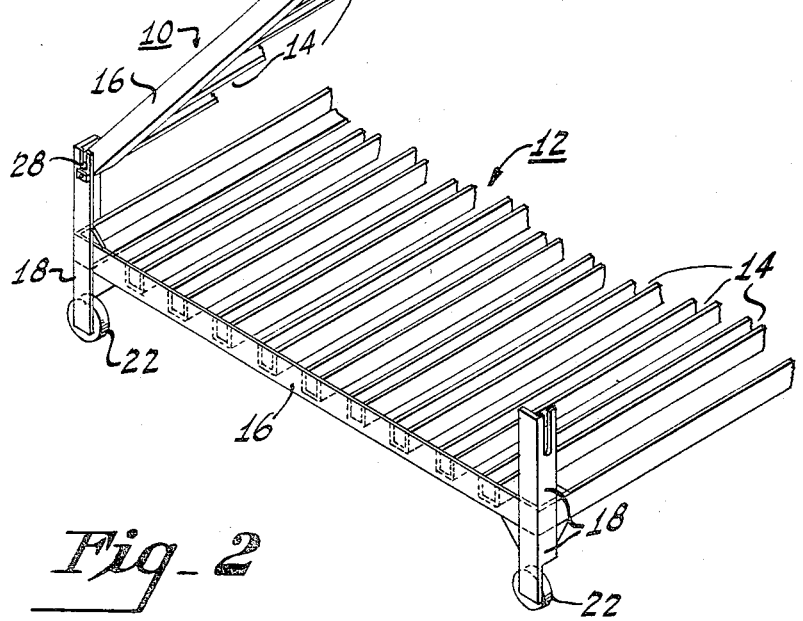
INVENTOR.
DON G. HUTTON
BY Charles H. Brown
ATTORNEY March 22, 1960     D. G. HUTTON     2,929,104
RESILIENTLY MOUNTED SELF-ALIGNING MOLD STRUCTURE
Filed April 2, 1954     3 Sheets-Sheet 2
Fig_3
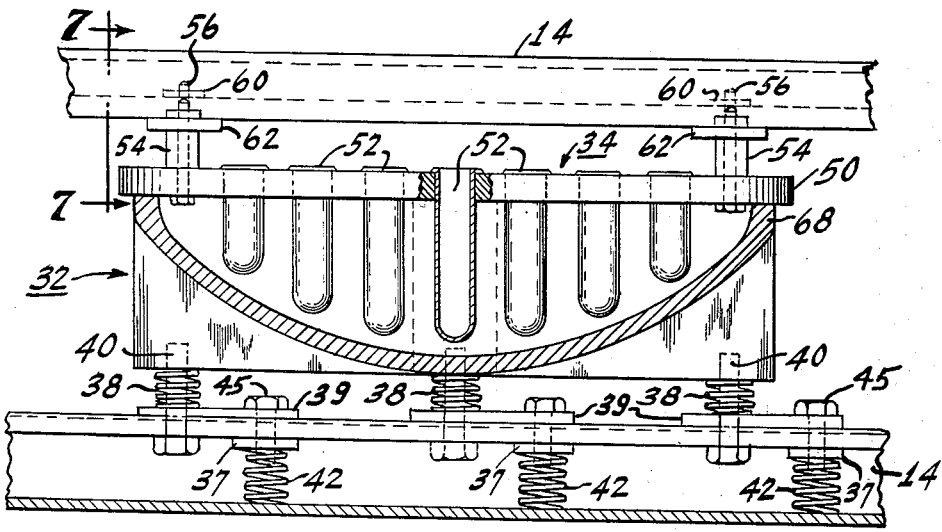
Fig_4
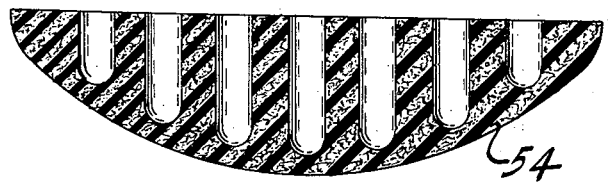
Fig_7
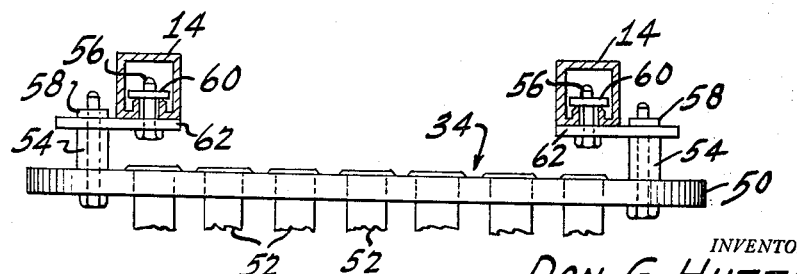
INVENTOR.
DON G. HUTTON
BY Charles H. Brown
ATTORNEY March 22, 1960 D. G. HUTTON 2,929,104
RESILIENTLY MOUNTED SELF-ALIGNING MOLD STRUCTURE
Filed April 2, 1954 3 Sheets-Sheet 3
Fig_5
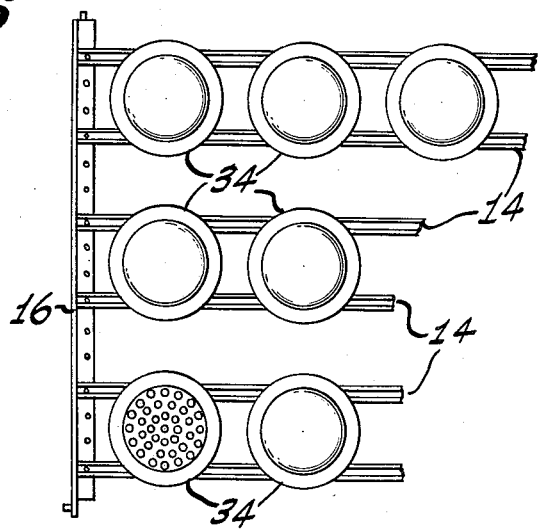
Fig_6
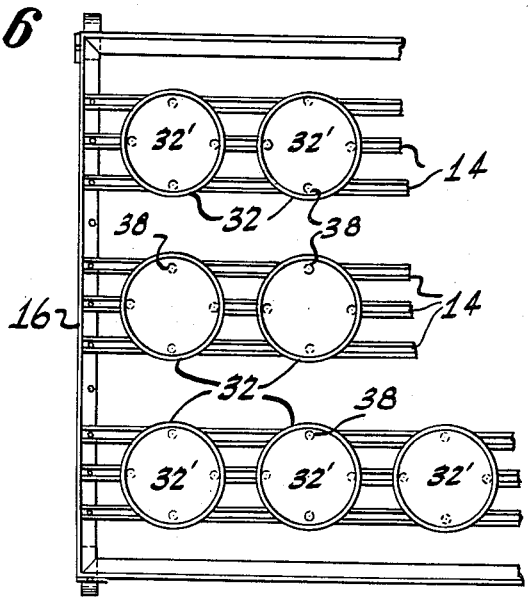
INVENTOR.
DON G. HUTTON
BY Charles H. Brown
ATTORNEY

2,929,104
RESILIENTLY MOUNTED SELF-ALIGNING MOLD STRUCTURE

Don G. Hutton, Yonkers, N.Y., assignor to Hudson Foam Latex Company

Application April 2, 1954, Serial No. 420,489

4 Claims. (Cl. 18—39)

This invention relates to apparatus for molding spongy articles, such as resilient flexible seat cushions, pads, mattresses and the like.

The mold in which the spongy article is made comprises a pair of opposed separable sections. One of these sections is a cavity and may be termed the female part of the mold. The foamed or frothed fluid-like material from which the spongy article is made, such as a foamed latex composition is poured into the cavity. The other section, which may be termed the male part of the mold, usually contains a plurality of spaced cores or projections attached to the interior wall and designed to penetrate the foamed composition when the two parts of the mold are brought together. These cores or projections produce cored openings in the finished molded product which reduce the weight of the article and enable a saving in material. When the two sections of the mold are brought together, the excess foamed material is squeezed out of the mold at the parting lines. If the foamed material is a latex composition, the mold is placed into an oven where the material is vulcanized before the finished product is removed from the mold.

One difficulty with such two-section-molds is that when the two sections are brought together even slight tolerances caused by the mounting of the sections prevent complete closing and perfect mating of the mold sections as a result of which there is a departure from symmetry in the making of the spongy article, among other disadvantages. Such tolerances also interfere with the use of multiple molds mounted on the same supports.

An object of the present invention is to provide a self-leveling mold jig or support which permits perfect mating of the separable sections of two-part molds despite tolerances and deviations from absolute symmetry in the mounting members or supports for the mold sections.

Another object is to simplify the manufacture of molded spongy articles by enabling the simultaneous molding of a plurality of spongy articles, by the use of self-leveling molds mounted upon a common support in such manner as to cause perfect mating of the parts.

A brief description of the manner in which the foregoing and other objects of the invention are achieved will now be given. The female or cavity sections of a plurality of two-part molds are resiliently mounted side-by-side on spaced horizontally positioned metallic channel members, in turn, supported at their ends by metallic cross-members. Each female mold section is of generally rectangular configuration with a central depressed or bowed base portion to form the cavity into which the frothy or foamed latex composition is poured. Each of the four corners of the female mold section is resiliently mounted on a spring held in position between the mold section and the channel member on which it rests. Above the female mold sections are the male mold sections arranged side-by-side and fixedly supported by horizontally positioned metallic channel members whose ends are secured together by metallic cross-members. The top and bottom channel members which respectively support the male and female mold sections are, in effect, integral parts of two rectangular frames. These frames are hinged together along one of the long longitudinal edges. The male mold sections in the upper frame are accurately spaced relative to the female cavity sections in the lower frame in such manner that corresponding mold sections of the separable two-part molds accurately register or mate with one another when the two rectangular frames are brought together. The resilient spring supports on the four corners of each of the female mold sections permit perfect closing of the two parts of each mold even though there may exist some unevenness in the mounting of the mold parts. The reason for this is that the resilient springs effect a self-leveling action which enables the adjoining mold sections to close completely. The invention permits the simultaneous molding of a multiplicity of spongy articles by means of a multiplicity of molds mounted on common support members, thus simplifying manufacture, and reducing the cost.

A more detailed description of the invention follows, in conjunction with drawings, wherein:

Fig. 1 is a side elevation view of the two frame members of the molding apparatus of the invention;

Fig. 2 is a fragmentary perspective view of the two frame members of the molding apparatus of Fig. 1, with the two-part molds removed, in order to more clearly illustrate the channel members on which the separable parts of the molds are mounted;

Fig. 3 is a cross sectional view of one of the two-part seat cushion molds in closed position, to show the manner in which the separable sections of the mold are attached to the channel members;

Fig. 4 shows a vertical cross section through a portion of a molded seat cushion made by the mold of Fig. 3;

Fig. 5 is a fragmentary view of the upper frame member of the molding apparatus of Figs. 1 and 2 with several male molding sections supported thereby, as seen from the inside looking up; and Fig. 6 is a fragmentary plan view of the lower frame member of the molding apparatus of Figs. 1 and 2 with several female cavity mold sections supported thereby, as seen looking down on the frame.

Fig. 7 is a section view through Fig. 3 along line 7—7.

Throughout the figures of the drawing, the same parts are designated by the same reference numerals.

Referring to the drawing, the molding apparatus comprises two metallic rectangular frames 10 and 12, respectively, each having a plurality of horizontally positioned U-shaped metallic channel members 14 firmly secured together by metallic angle-iron type cross members 16 to which the channel members are bolted or riveted. The lower rectangular frame 12 is mounted at its four corners on vertical angle irons 18, in turn, mounted on rollers 22. Each vertical angle iron has a vertical slot 24 near its upper end for accommodating a metallic pin 28 on the four corners of the upper frame 10. The upper frame 10 is hingedly joined to the lower frame 12 at one end by means of the metallic pins 28 slideably fitting into the slots 24 at that end. The bolted metallic rectangular-shaped plates 30 on the two vertical angle irons at that end control the extent to which the pins 28 are permitted to enter the slots 24. Figures 1 and 2 show the upper rectangular frame 10 in raised position.

Resiliently mounted on the channel members 14 of the lower frame 12 are a plurality of cavity or female parts or sections 32 of two-part metallic molds whose upper parts or sections 34 are fixedly secured to the channel members of the upper frame 10. Each cavity section 32 is of generally rectangular or circular shape with a central depressed or bowed base portion to form the cavity 32' into which the frothy or foamed composition is poured. The shape of the cavity may of course vary to suit the purpose of the finished product. Such shapes may, for example have paraboloidal or semi-ellipsoidal curvatures. The four corners of the female mold cavity section are mounted on resilient coiled springs 38. A bolt 40 threadedly engages each corner of the cavity mold section 32 and passes through the hollow interior of the helical coiled springs 38 into the interior of the U-shaped channel members 14. The bolt 40 passes through a flat metallic plate 39, and the head of bolt 40 rests about one-quarter inch below plate 39 in a position between the downturned lips 43 of the channel member 14. Another metallic plate 37 is firmly held between the legs of the channel member 14 against the lips 43 by another bolt 45 which also passes through plate 39. The end of bolt 45 is attached to and enters the interior of another spring 42. The coiled springs 42 are located within the channel members 14 to enable the proper positioning of small rectangular plates 37 and bolts 40 before the cavity mold section is placed upon the channel members. The springs 42 and bolts 40 are positioned between the legs of the U-shaped channel members and adjustably positioned so that the bolts 40 can threadedly engage the threaded openings in the four corners on the bottom of the cavity mold sections. The one-quarter inch spacing between the head of bolt 40 within the channel member 14 and the bottom of plate 39 enables the female mold section 32 to rise slightly during the process of separating the male and female parts, after curing of the sponge rubber article thus avoiding a too rigid attachment of section 32 to the supporting frame. The upper or male mold sections serve to close the cavity mold sections when the upper frame 10 is lowered completely to rest on the lower frame 12.

Fig. 3 shows a single complete 2-section mold, in cross-section, when the two opposed separable parts mate perfectly in the closed position of the rectangular frames 10 and 12. The springs 38 and 42 in the middle of Fig. 3 are actually on the far side of the cavity mold. Each male section includes a metallic member 50 which supports the mold pins or cores 52. These pins or cores are designed to form openings extending vertically from the base of the molded product and are mounted upon the upper section in the number and spacing required. The cavity mold may be filled with a sponge rubber composition to form a seat cushion 54 or the like, as shown in Fig. 4. Each member 50 of the upper mold sections is fixedly secured to a plurality of U-shaped channel members 14 in the upper frame 10, as shown in Figs. 1, 3 and 7, by means of bolts 54, 56, nuts 58, 60 and metallic cross-linking plates 62.

It should be noted that the cavity mold sections 32 are resiliently mounted on their four corners to the channel members 14 by virtue of the resilient coiled springs 38. Should there be any slight departure in the positioning of either of the mold sections from perfect symmetry in the horizontal plane, the corner portions of cavity mold section 32 at the springs 38 will move independently to make a perfect closure with the corresponding male mold section 34 in the upper frame 10, when the hinged frames are brought together by the lowering of the upper frame. As the two frames are moved together in closing relationship, the opposed section of each two-part mold adjust to each other to make a complete closing of the mold 32. The land 68 of the cavity mold is of comparatively small cross-sectional area so that the separable sections of the mold provide ideal parting surfaces.

The rollers 22 at the bottom of the four vertical angle irons 18 which support the lower rectangular frame 12 at its corners, enable the entire molding apparatus with its molds to be rolled into a heated oven for curing or setting the foamed latex composition after such frothy material has been poured into all of the mold cavities and the two frames 10 and 12 have been brought together.

Although the use of channel members 14 is preferred and has desirable advantages in the practice of the invention, it should be understood that the invention is not limited to the use of such channel members, and if desired, the channel members 14 can be replaced by angle irons with a consequent sacrifice of the advantages.

What is claimed is:

1. Molding apparatus for spongy articles comprising an upper and a lower frame hingedly joined along one side, said lower frame having horizontally positioned metallic U-shaped channel members, a plurality of spaced cavity mold sections resiliently mounted on said channel members and movable independently of each other, each cavity mold being resiliently supported at a plurality of spaced points along its bottom on a plurality of said channel members, there being a coiled spring at each of said spaced points between said cavity mold and a channel member, and a bolt passing through the interior of each of said springs and entering at one end into the bottom of said cavity mold, the other end of said bolt being positioned between the legs of a U-shaped channel member, a corresponding plurality of spaced male mold sections fixedly mounted on said upper frame, each cavity mold section in the lower frame and its corresponding male mold section in the upper frame constituting a complete two-section mold with opposed separable sections, whereby the resilient mounting of said cavity section assures mating of the two sections of each mold.

2. Molding apparatus in accordance with claim 1, wherein said frames are rectangular-shaped, said lower frame having vertical angle irons at its four corners, each angle iron being mounted on rollers at its bottom end and having slots at its upper end, said upper frame having metallic pins at its four corners adapted to slidably fit into the slots in said angle irons.

3. Molding apparatus for spongy articles comprising upper and lower frames hingedly joined along one side, said lower frame having horizontally positioned metallic members, a plurality of spaced cavity mold sections resiliently and independently mounted at laterally spaced points on said members and movable independently of each other in a vertical direction and at angles inclined thereto, a corresponding plurality of spaced male mold sections fixedly mounted on said upper frame, each cavity mold section in the lower frame and its corresponding male mold section in the upper frame constituting a complete two-section mold with opposed separable sections, whereby the resilient mounting of said cavity section assures mating of the two sections of each mold.

4. A mold for rubber articles, comprising a pair of separable mold sections, one of said mold sections being a cavity mold independently and resiliently mounted at several symmetrically spaced points along its bottom upon spaced parallel channel members, said channel members being U-shaped and having the upper edges of the legs downturned to form lips, there being provided at each point of mounting of said cavity mold: a metallic plate across the legs of the channel member, a bolt having a shank passing through a coiled spring resting between said plate and the bottom of said cavity mold, said shank being threaded and threadedly engaging the bottom of said cavity mold, said bolt having a head positioned between the legs of said channel member below said plate, another metallic plate positioned between the legs of said channel member and adapted to rest against the downturned lips of said channel member, a coiled spring between said last plate and the bottom interior of the channel member, and another bolt passing through both of said plates.

References Cited in the file of this patent

UNITED STATES PATENTS

| | | | |
|---|---|---|---|
| 944,053 | Savage | Dec. 21, | 1909 |
| 2,185,597 | Klemschofski et al. | Jan. 2, | 1940 |
| 2,204,151 | Rodefer | June 11, | 1940 |
| 2,351,529 | Luxenberger | June 13, | 1944 |
| 2,353,492 | O'Connor | July 11, | 1944 |
| 2,360,201 | Clayton et al. | Oct. 10, | 1944 |
| 2,448,640 | Weston | Sept. 7, | 1948 |
| 2,457,336 | Wilson | Dec. 28, | 1948 |
| 2,574,391 | Herrly | Nov. 6, | 1951 |
| 2,577,412 | Ferrell | Dec. 4, | 1951 |
| 2,607,080 | Stewart | Aug. 19, | 1952 |
| 2,613,394 | Doherty | Oct. 14, | 1952 |
| 2,655,692 | Fay | Oct. 20, | 1953 |